(12) United States Patent
Johnson et al.

(10) Patent No.: US 11,073,091 B2
(45) Date of Patent: Jul. 27, 2021

(54) GAS TURBINE ENGINE WITH INTEGRATED AIR CYCLE MACHINE

(71) Applicant: General Electric Company, Schenectady, NY (US)

(72) Inventors: Steven Douglas Johnson, Milford, OH (US); Jeffrey Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 248 days.

(21) Appl. No.: 16/008,628

(22) Filed: Jun. 14, 2018

(65) Prior Publication Data

US 2019/0383219 A1  Dec. 19, 2019

(51) Int. Cl.
| | |
|---|---|
| *F02C 9/18* | (2006.01) |
| *F02C 6/08* | (2006.01) |
| *F02C 7/32* | (2006.01) |
| *F02C 7/18* | (2006.01) |

(52) U.S. Cl.
CPC .................. *F02C 9/18* (2013.01); *F02C 6/08* (2013.01); *F02C 7/185* (2013.01); *F02C 7/32* (2013.01); *F05D 2260/20* (2013.01); *F05D 2260/53* (2013.01); *F05D 2260/606* (2013.01)

(58) Field of Classification Search
CPC .. F02C 3/055; F02C 3/107; F02C 6/08; F02C 7/125; F02C 7/14; F02C 7/141; F02C 7/18; F02C 7/185; F02C 7/32; F02C 9/18; F02K 3/115; F05D 2260/20; F05D 2260/213; F05D 2260/50; F05D 2260/606
See application file for complete search history.

(56) References Cited

U.S. PATENT DOCUMENTS

| | | | | |
|---|---|---|---|---|
| 5,136,837 | A | * | 8/1992 | Davison ............. F02C 6/08 60/785 |
| 5,611,197 | A | * | 3/1997 | Bunker ............. F02C 7/224 60/806 |
| 8,347,647 | B2 | | 1/2013 | McAuliffe et al. |
| 8,347,648 | B2 | | 1/2013 | Nakazeki et al. |
| 8,789,376 | B2 | | 7/2014 | Coffinberry |
| 8,935,928 | B2 | | 1/2015 | Mills |
| 8,955,794 | B2 | * | 2/2015 | Mackin ............. F02C 6/12 244/53 R |
| 8,967,528 | B2 | * | 3/2015 | Mackin ............. F02C 7/32 244/53 R |
| 9,656,756 | B2 | | 5/2017 | Atkey |
| 9,810,158 | B2 | * | 11/2017 | Foutch ............. F02C 7/18 |

(Continued)

*Primary Examiner* — Arun Goyal

(74) *Attorney, Agent, or Firm* — Dority & Manning, P.A.

(57) ABSTRACT

A gas turbine engine includes: a compressor, a combustor, and a turbine arranged in sequential flow relationship along a primary flowpath, the turbine being connected in mechanical driving relationship to the compressor, so as to define at least one engine rotor that is rotatable about a centerline axis of the engine; a secondary flowpath connected in flow communication with the primary flowpath; and an air cycle machine including an air cycle rotor carrying an at least one air cycle compressor and at least one air cycle expander, wherein: the air cycle rotor is coupled in mechanical driving relationship with the at least one engine rotor; the air cycle rotor is coupled in fluid flow communication with the secondary flowpath; and the air cycle rotor is coupled in fluid flow communication with at least one heat exchanger.

16 Claims, 3 Drawing Sheets

(56) References Cited

U.S. PATENT DOCUMENTS

| | | | |
|---|---|---|---|
| 10,316,750 B2* | 6/2019 | Loebig | F28F 3/048 |
| 10,450,074 B2* | 10/2019 | Stieger | F02C 9/18 |
| 10,578,028 B2* | 3/2020 | Becker, Jr. | F02C 9/18 |
| 2017/0057641 A1 | 3/2017 | Koerner et al. | |
| 2017/0082028 A1* | 3/2017 | Duong | F02K 3/115 |
| 2017/0341757 A1 | 11/2017 | Weber et al. | |
| 2018/0010981 A1 | 1/2018 | Army et al. | |

* cited by examiner

GAS TURBINE ENGINE WITH INTEGRATED AIR CYCLE MACHINE

BACKGROUND OF THE INVENTION

This present invention relates generally to cooling of gas turbine engines, and more particularly, to air cycle machines used for cooling gas turbine engines.

In gas turbine engines, compressor bleed air is often used for various purposes such as the cooling of the turbine section of the engine, cooling the engine augmentor (afterburner), or pressurizing bearing sumps.

In many cases, bleed air is directly used for cooling. However, it is also known in the prior art to extract or bleed air, pass it through a heat exchanger to reduce its temperature, and then to provide it to the component or system to be cooled. This is referred to as "cooled cooling air" (CCA).

It is also known to use engine bleed air for external purposes such as aircraft cooling. Such cooling systems often use "air cycle machines" (ACM). An ACM incorporates a hot side heat exchanger and a cold side heat exchanger connected in a loop with a compressor and an expander. Typically, the compressor and expander are connected by a shaft. This device operates in a reverse Brayton cycle, also known as a Bell-Coleman cycle.

It is generally desirable to increase the pressure and reduce the temperature of cooling air, especially where it is to be used for turbine components. For example, if the coolant is available in sufficient quantity and quality, it might permit the use of metal components instead of ceramic components in high-temperature environments. In particular, it is desirable to provide the cooling air at or above compressor discharge pressure ("P3"), the highest static pressure in the engine during operation.

One problem with existing technology is that providing cooled cooling air at or above a pressure of P3 would require the installation of a large air cycle machine in the engine "under-cowl" area (i.e., exterior to the engine casing and internal to the cowling), or on the aircraft itself.

BRIEF DESCRIPTION OF THE INVENTION

This problem is addressed by a gas turbine engine incorporating an integrated air cycle machine in combination with a heat exchanger, for cooling bleed air.

According to one aspect of the technology described herein, a gas turbine engine includes: a compressor, a combustor, and a turbine arranged in sequential flow relationship along a primary flowpath, the turbine being connected in mechanical driving relationship to the compressor, so as to define at least one engine rotor that is rotatable about a centerline axis of the engine; a secondary flowpath connected in flow communication with the primary flowpath; and an air cycle machine including an air cycle rotor carrying at least one air cycle compressor and at least one air cycle expander, wherein: the air cycle rotor is coupled in mechanical driving relationship with the at least one engine rotor; the air cycle rotor is coupled in fluid flow communication with the secondary flowpath; and the air cycle rotor is coupled in fluid flow communication with at least one heat exchanger.

According to another aspect of the technology described herein, 14. A method of cooling air in a gas turbine engine of the type including a compressor, a combustor, and a turbine arranged in sequential flow relationship along a primary flowpath, the turbine being connected in mechanical driving relationship to the compressor, so as to define at least one engine rotor that is rotatable about a centerline axis of the engine, the method comprising: a secondary flowpath connected in flow communication with the primary flowpath; and bleeding air from the compressor from the primary flowpath into a secondary flowpath; compressing the air bled from the compressor using an air cycle machine including an air cycle rotor carrying an at least one air cycle compressor and at least one air cycle expander, wherein the air cycle rotor is mechanically driven by the at least one engine rotor; passing the compressed air from the air cycle compressor to a heat exchanger and rejecting heat from the compressed air; and passing the compressed air from the heat exchanger through the air cycle expander.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
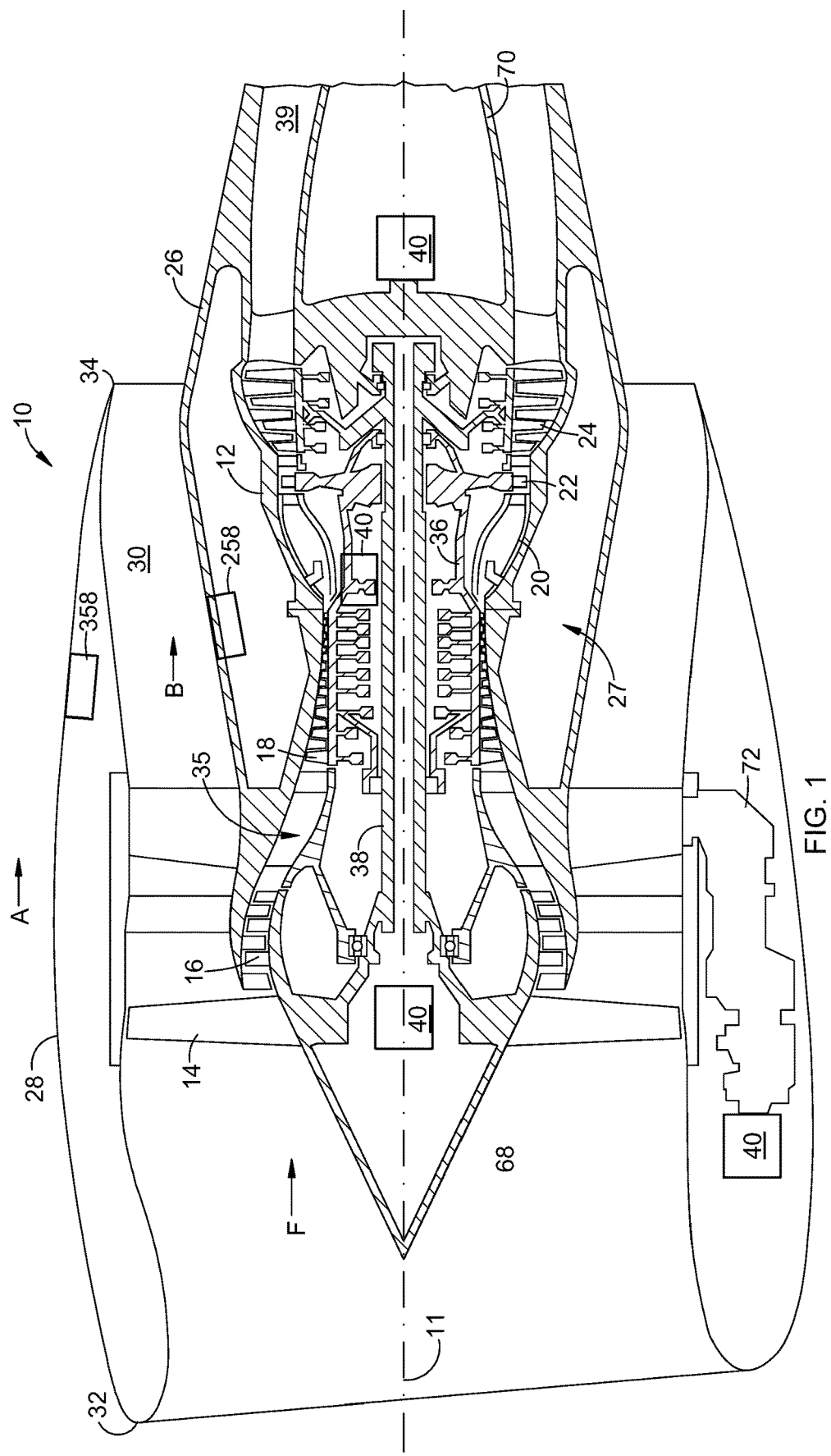
FIG. 1 is a schematic, cross-section view of a gas turbine engine with an integrated air cycle machine.

Referring to the drawings wherein identical reference numerals denote the same elements throughout the various views, FIG. 1 depicts an exemplary gas turbine engine 10. While the illustrated example is a high-bypass turbofan engine, the principles of the present invention are also applicable to other types of engines, such as low-bypass turbofans, turbojets, turboprops, variable-cycle engines, etc. The engine 10 has a longitudinal center line or axis 11 and a stationary core casing 12 disposed concentrically about and coaxially along the axis 11.

It is noted that, as used herein, the terms "axial" and "longitudinal" both refer to a direction parallel to the centerline axis 11, while "radial" refers to a direction whose vector intersects the axis 11 and is perpendicular to it, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 14, low-pressure compressor or booster 16, high-pressure compressor or "HPC" 18, combustor 20, high-pressure turbine or "HPT" 22, and low-pressure turbine or "LPT" 24 arranged in serial flow relationship.

The HPC 18, combustor 20, and HPT 22 collectively define a core of the engine 10. The fan 14, booster 16, and LPT 24 collectively define a low-pressure system of the engine 10.

An annular core nacelle 26 surrounds the engine core as well as the booster 16. The core nacelle 26 may alternatively be referred to as a "cowl" and the space between the core casing 12 and the core nacelle 26 may be referred as an "under-cowl area" 27 of the engine 10. A fan nacelle 28 surrounds the core nacelle 26 and the fan 14. The core nacelle 26 is spaced-away from the fan nacelle 28 and a fan duct 30 is defined in the space between the two nacelles. The fan duct 30 communicates with an engine inlet 32 at its upstream end and a fan nozzle 34 at its downstream end.

The stationary and rotating components of the engine 10 collectively define a primary flowpath 35 which extends from the booster 16, through the HPC 18, combustor 20, HPT 22, and LPT 24, to a core nozzle 39. It will be understood that the primary flowpath 35 has a complex three-dimensional shape with inboard and outboard boundaries. The primary flowpath 35 is distinct from a bypass flowpath passing through the engine inlet 32 through the fan 14, fan duct 30 and fan nozzle 34. The primary flowpath 35 is also distinct from secondary flowpaths of the engine 10. The term "secondary flow path" refers to various paths within the engine 10 through which air flows for reasons such as leakage from the primary flowpath, component cooling, sump pressurization, and purge flow. The secondary flowpaths of the engine 10 are often but not exclusively located inboard of the primary flowpath 35 relative to the centerline axis 11.

In operation, pressurized air from the compressor 18 is mixed with fuel in the combustor 20 and ignited, thereby generating combustion gases. Some work is extracted from these gases by the high-pressure turbine 22 which drives the compressor 18 via an outer shaft 36. The combustion gases then flow into the low-pressure turbine 24, which drives the fan 14 and booster 16 via an inner shaft 38. The inner and outer shafts 38 and 36 are rotatably mounted in bearings 30 which are themselves mounted in a fan frame 32 and a turbine rear frame 34.

Collectively, the HPC 18, HPT 22, the outer shaft 36, and any other connected co-rotating components may be referred to herein as "the HP rotor" of the engine 10. Collectively, the fan 14, booster 16, LPT 24, the inner shaft 38, and any other connected co-rotating components may be referred to herein as "the LP rotor" of the engine 10.

The engine 10 incorporates an integral air cycle machine in combination with a heat exchanger, for cooling air bleed from the HPC 18 to provide cooled cooling air or "CCA". Non-limiting examples of locations where air cycle machines could be integrated within the engine 10 are shown schematically by boxes labeled 40 in FIG. 1.

Figure 2:
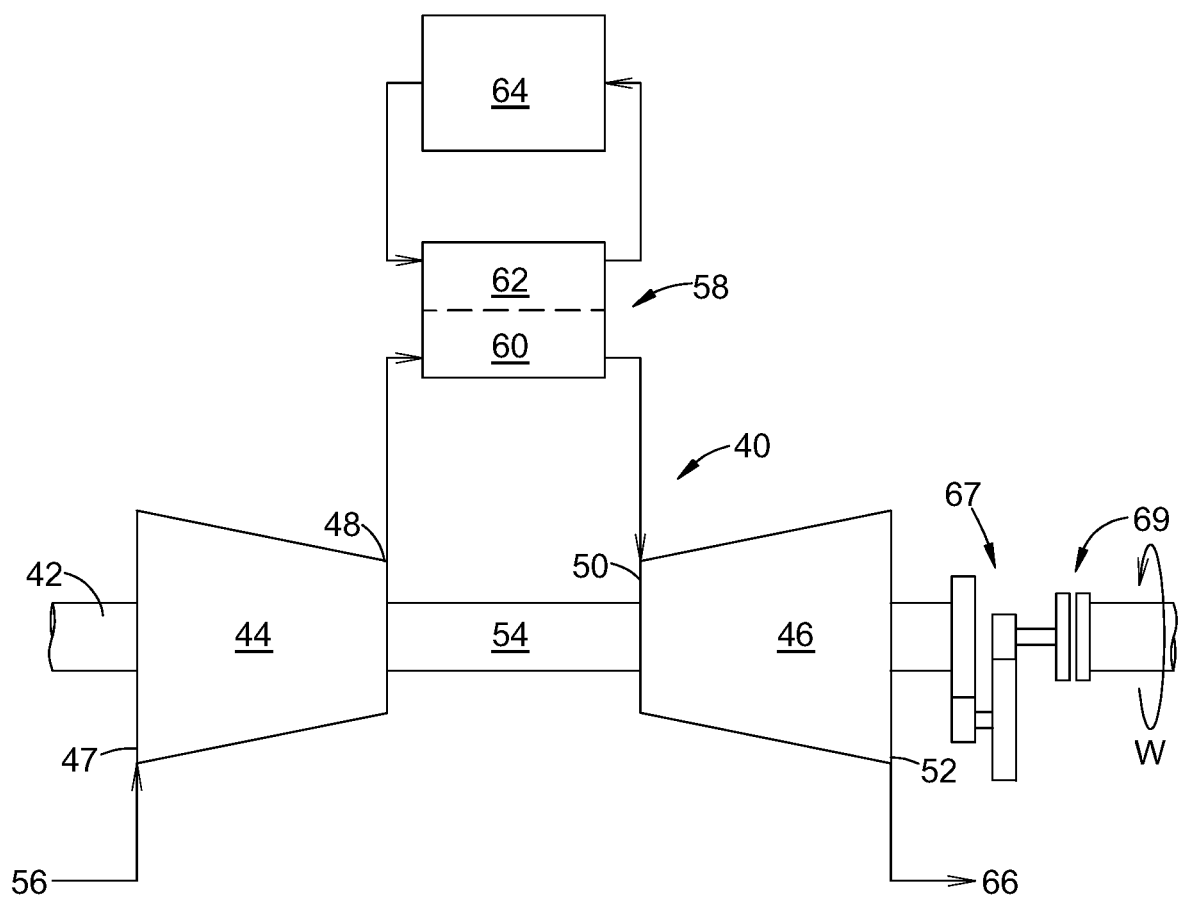
FIG. 2 is a schematic diagram of an exemplary air cycle machine which is coupled to a heat exchanger.

FIG. 2 illustrates an exemplary air cycle machine (or ACM) 40. The air cycle machine 40 includes a rotatable air cycle rotor 42 carrying an air cycle compressor 44 and an air cycle expander 46. The air cycle compressor 44 is operable to receive air at an inlet 47 thereof, increase its pressure and temperature, and discharge it at an outlet thereof 48. It may be a single-stage or multi-stage machine. Optionally, more than one air cycle compressor 44 may be coupled to the air cycle rotor 42. The air cycle expander 46 is operable to receive air at an inlet thereof 50, decrease its pressure and temperature, and discharge it at an outlet 52 thereof. It may be a single-stage or multi-stage machine. Optionally, more than one air cycle expander 46 may be coupled to the air cycle rotor 42. The air cycle compressor 44 and the air cycle expander 46 are mechanically coupled, for example by an air cycle shaft 54.

An ACM 40 of the type shown in FIG. 2 may be coupled to the engine 10 in a manner such that bleed air can be extracted from the HPC 18, reduce the temperature and optionally increase the pressure of the bleed air, and then used for cooling in a downstream portion of the engine 10.

FIG. 2 shows diagrammatically how this may be achieved. A supply of bleed air from the HPC 18 is shown at the arrow 56, coupled in fluid flow communication with the inlet 46 of the air cycle compressor 44.

A heat exchanger 58 is shown having a first fluid flowpath or interface (referred to as a "first side" 60) communicating with the outlet 48 of the air cycle compressor 44 and with the inlet 50 of the air cycle expander 46. A second fluid flowpath or interface (referred to as a "second side" 62) of the heat exchanger 58 is thermally coupled to a cold sink 64.

As used herein the term "cold sink" refers to any source of low-temperature fluid to which heat can be rejected. Several examples of potential cold sinks are described below. As will be explained in more detail below, the purpose of the heat exchanger 58 is to cool the bleed air.

As used herein, structures which are "thermally coupled" to each other are configured and/or positioned such that they are capable of transferring heat energy between each other. The mode of heat transfer may be conduction, convection, radiation, or any combination thereof. For example, two mechanical elements in physical contact may be capable of heat transfer by direct conduction and thus would be considered "thermally coupled". As another example, two mechanical elements mutually exposed to fluid flow within a duct may be capable of heat transfer by convection, and thus would be considered "thermally coupled".

The air cycle expander 46 discharges CCA as described above. The outlet 52 of the air cycle expander 46 is coupled in fluid flow communication with a downstream system or component which consumes the cooled cooling air. Arrow 66 shows the CCA flow diagrammatically.

The air cycle rotor 42 is coupled in mechanical driving relationship with at least one of the engine rotors described above (e.g., HP or LP). This is shown diagrammatically by the work input arrow labeled "W". Optionally, the air cycle rotor 42 may be coupled to the engine rotor through one or more stages of gearing effective to drive the air cycle rotor 42 at a higher or lower shaft speed than the engine rotor. A representative gearbox 67 is depicted in FIG. 2. Optionally, the air cycle rotor 42 may be coupled to the engine rotor through a clutch operable to selectively engage or disengage the driving connection. Known types of clutches include mechanical, fluid, and magnetic. A representative clutch 69 is shown in FIG. 2. The engagement or disengagement of the clutch 69 may be controlled by signal from an electronic controller such as a full authority digital engine control (FADEC) or similar device (not shown). Optionally, the clutch may include a one-way or overrunning functionality. Optionally, the air cycle rotor 42 may be coupled to the engine rotor using both a gearbox 67 and a clutch 69. Optionally, the functions of gearbox and clutch may be physically combined in a single housing.

As noted above, the ACM 40 is integral to the gas turbine engine 10. Several embodiments of gas turbine engines with integral air cycle machines are described below. A common feature of all the integral configurations described herein is that a rotor of the ACM is in rotary driving relationship (or rotationally coupled to) one of the engine rotors (i.e., HP or LP).

This is a functional difference from prior art devices. In prior art air cycle machines, the primary or sole driving torque of the compressor shaft is provided by the expander turbine. (There may be some instances where an electric motor or other device is used to provide a starting torque). Thus, in the prior art, the air cycle machine rotor is free to seek a speed determined by the load on it. In contrast, in the concept described herein, the air cycle machine rotor is coupled in driving relationship to the gas turbine engine rotor.

In one example, the term "integral" may refer to the ACM 40 being located inside of the fan nacelle 28.

In another example, the term "integral" may refer to the ACM 40 being inside (i.e. inboard of the outer boundaries) of the core nacelle 26. In a further variation of this example, the term "integral" may refer to the ACM being located in the under-cowl area 27.

In another example, the term integral may refer to the ACM 40 being located inside (i.e., inboard of the outer boundaries) of the engine casing 12.

In another example, the term "integral" may refer to the ACM 40 being located inboard (i.e., inboard of the outer boundaries of) the primary flowpath 35 of the engine 10.

In another example, an ACM 40 could be located inside a fan spinner cone 68 (FIG. 1) located axially forward of the fan 14 and having a hollow interior.

In another example, an ACM 40 could be located inside a center body 70 located axially aft of the LPT 24 and having a hollow interior.

In another example, the term "integral" may refer to an ACM driven by the engine accessory gearbox (AGB) 72 which is itself located with the interior of the fan nacelle 28, or in the under-cowl area 27, depending on the location of the AGB 72.

In another example, the term "integral" may refer to an ACM that is physically combined with the engine 10.

Figure 3:
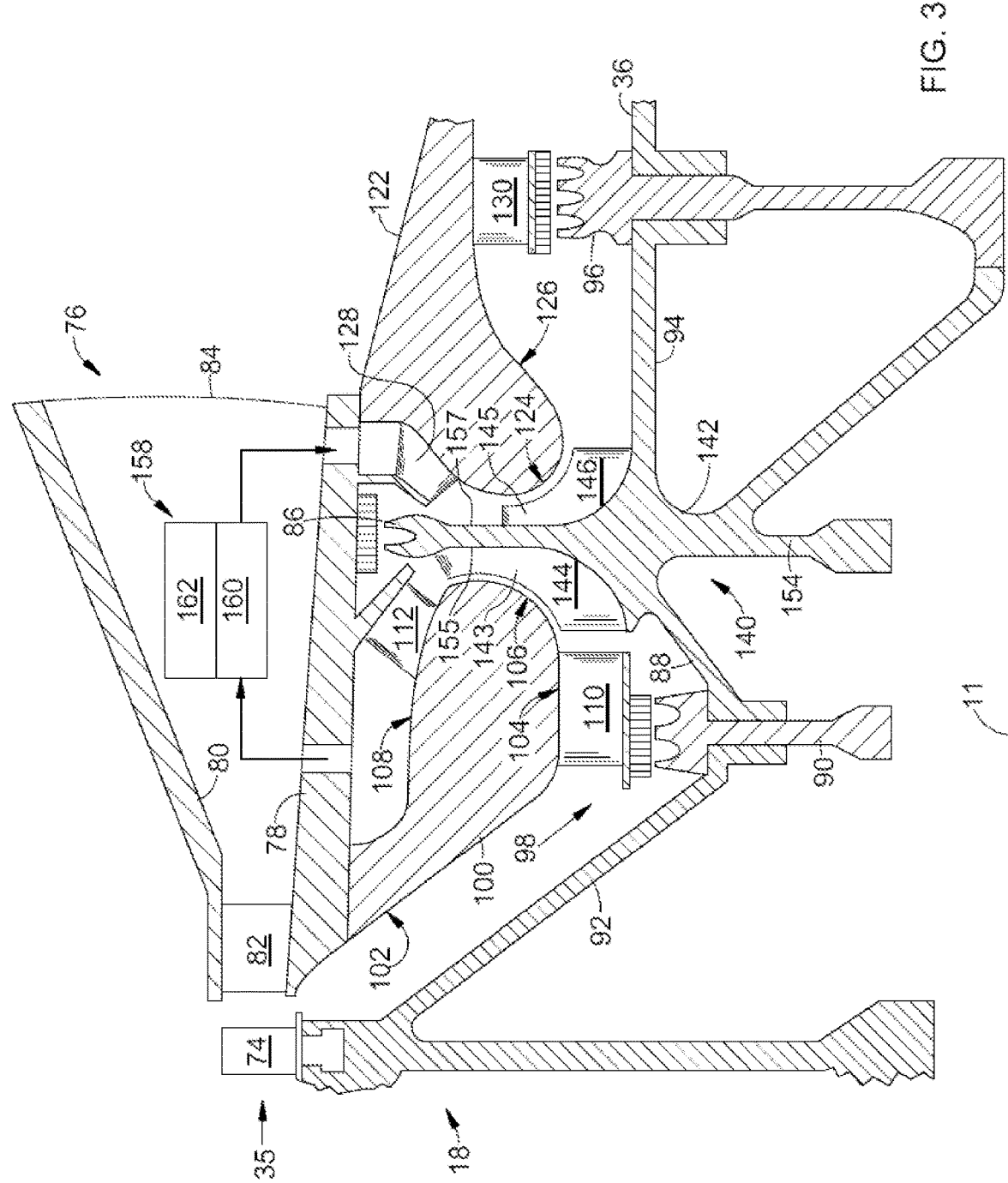
FIG. 3 is a schematic, half-sectional view of a portion of a gas turbine engine incorporating an integral air cycle machine.

FIG. 3 illustrates an example of an ACM 140 which is located inboard of the engine casing 12 as described above, and is also is physically integrated into (i.e., combined into) the turbomachinery structure of the gas turbine engine 10.

The last compressor stage 74 of the HPC 18 is shown in FIG. 3. A diffuser 76 is disposed downstream and axially aft of the last compressor stage 74. The diffuser is a stationary annular structure bounded by an annular inner wall 78 and an annular outer wall 80. The diffuser 76 has an upstream inlet 82 and a downstream outlet 84, both communicating with the primary flowpath 35. A combustor (not shown) would be located downstream of the outlet 84. The diffuser 76 has an increasing flow area from the inlet 82 to the outlet 84. Its purpose and function is to accept compressed air from the HPC 18 and to increase its static pressure before discharging into the combustor.

An air cycle rotor 142 is disposed inboard of the diffuser 76. It includes an annular rotor disk 154 which has opposed forward face 155 and aft face 157. The forward face 155 has an array of compressor blades 143 extending therefrom, defining an air cycle compressor 144. The aft face 157 has an array of expander blades 145 extending therefrom defining an air cycle expander 146. A rotating seal 86 is disposed at a rim of the rotor disk 154.

The air cycle rotor 142 is integrated into the outer shaft 36 described above. A forward extension 88 of the air cycle rotor 142 is coupled to a rotating inner rotating seal 90 which is in turn coupled to a conical aft arm 92 of the HPC 18. An aft extension 94 of the air cycle rotor 142 is coupled to a rotating compressor discharge seal 96. As noted above, aft portions of the outer shaft 36 are coupled to the HPT 22 and thus in mechanical driving relationship to the air cycle rotor 142.

Collectively, surfaces of the aft arm 92, inner rotating seal 90, air cycle rotor 142, aft extension 94, and compressor discharge seal 96 define one boundary of an air cycle flowpath 98.

An annular forward wall structure 100 is positioned inboard of the diffuser 76 and upstream or axially forward of the air cycle rotor 142. The forward wall structure 100 is generally L-shaped when viewed in half-section and includes a forward face 102 disposed at an acute angle to the axis 11, an inner face 104, an aft face 106, and an outer face 108. The faces of the forward wall structure 100 collectively define a portion of a second boundary of the air cycle flowpath 98.

An array of air cycle compressor inlet vanes 110 are positioned between the forward wall structure 100 and the inner rotating seal 90 just upstream of the air cycle compressor 144. Their function is to increase the static pressure and decrease the tangential velocity of the air entering the air-cycle compressor 144, or to favorably direct the airflow into the air cycle compressor 144.

An array of air cycle compressor outlet vanes 112 are positioned between the forward wall structure 100 and the diffuser 76, just downstream of the air cycle compressor 144. Their function is to receive the airflow from the air cycle compressor 144 and increase its static pressure.

An annular aft wall structure 122 is positioned inboard of the diffuser 76 and aft of the air cycle rotor 142. The aft wall structure 122 is generally U-shaped when viewed in half-section and includes a forward face 124 disposed roughly perpendicular to the axis 11, and an aft face 126. The faces of the aft wall structure 122 collectively define another portion of the second boundary of the air cycle flowpath 98.

An array of air cycle nozzle vanes 128 are positioned between the aft wall structure 122 and the diffuser 76, just upstream of the air cycle expander 146. Their function is to direct the airflow into the air cycle expander 146 with an increased tangential velocity.

An array of air cycle outlet guide vanes 130 are positioned between the aft wall structure 122 and the compressor discharge seal 96 just downstream of the air cycle expander 146. These outlet guide vanes 130 may be used to increase the static pressure of the air cycle discharge air.

The air cycle machine 140 is thermally coupled to a heat exchanger. An exemplary heat exchanger 158 is shown having a first fluid flowpath or interface (referred to as a "first side" 160) communicating with the air cycle flowpath 98 so as to receive air discharged from the air cycle compressor 144 and to subsequently discharge air into the air cycle expander 146. A second fluid flowpath or interface (referred to as a "second side" 162) of the heat exchanger 158 is thermally coupled to a cold sink.

In the illustrated example, the heat exchanger 158 may be physically integrated into the diffuser 76, and the cold sink comprises primary flowpath air flowing through the diffuser 76.

In another example, shown in FIG. 1, a heat exchanger 258 may be located in flow communication with the fan duct 30, and the cold sink could comprise bypass air "B" flowing through the fan duct 30.

In another example, shown in FIG. 1 a heat exchanger 358 may be located in flow communication with the exterior of the fan nacelle 28, and the cold sink could comprise air "A" flowing exterior to the fan nacelle 28. As an alternative to air, the cold sink in any of these examples may be a tertiary fluid which is pumped through the heat exchanger (e.g. heat exchanger 158, 258, 358).

In operation, the apparatus shown in FIG. 3 including the ACM 140 and heat exchanger 158 may be operated in conjunction with the engine 10 in a reverse Brayton cycle (also referred to as a Bell Coleman cycle), as described above. Bleed air from the HPC 18 at or near compressor discharge conditions (i.e., pressure "P3", temperature "T3") enters the air cycle flowpath 98, passes through the air cycle compressor 144 which is driven by mechanical work input from the outer shaft 36. The air cycle compressor 144 increases the pressure and temperature of the air. The air is discharged through the compressor outlet vanes 112 and enters the heat exchanger 158 where heat is rejected to the heat sink. After passing through the heat exchanger 158, the air is directed through the air cycle nozzle vanes 128 into the air cycle expander 146. The air passes through the air cycle expander 146 reducing its pressure and temperature. It is then directed through the air cycle outlet guide vanes 130 to its final delivery condition (Pt, Ps, Tt) and then on to its final use, for example turbine cooling, aircraft use, etc.

Unlike prior art systems, it is possible that the cooled cooling air CCA can be at a pressure Pt, and/or Ps, greater than P3 and a temperature Tt less than T3. This high-pressure, low-temperature air is especially suitable for cooling and has the capability of reducing the mass flow of bleed air required or enabling less-temperature-capable materials to be used in the turbine.

The air cycle machine apparatus described herein has advantages over prior art devices for providing cooled cooling air. Depending on placement, it could be used to free up usable space in the undercowl, while providing the thermodynamic benefits of the air cycle machine, including the potential of providing cooling air to the HPT with pressure above P3 and temperature below T3.

The foregoing has described a gas turbine engine with an air cycle machine, and a method for its use. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A gas turbine engine, comprising:
 a compressor, a combustor, and a turbine arranged in sequential flow relationship along a primary flowpath, the turbine being connected in mechanical driving relationship to the compressor, so as to define at least one engine rotor that is rotatable about a centerline axis of the engine;
 a secondary flowpath connected in flow communication with the primary flowpath, wherein the secondary flowpath is positioned radially inward of the primary flowpath, relative to the centerline axis; and
 an air cycle machine including an air cycle rotor including an at least one air cycle compressor and at least one air cycle expander, wherein:
  the air cycle rotor is integrated into the at least one engine rotor;
  the air cycle rotor is in fluid flow communication with the secondary flowpath;
  the air cycle rotor is in fluid flow communication with at least one heat exchanger, and
  the air cycle rotor includes an annular rotor disk with a forward face and an aft face opposed from the forward face, the forward face including an array of compressor blades extending therefrom to define the at least one air cycle compressor and the aft face including an array of expander blades extending therefrom to define the at least one air cycle expander.

2. The engine of claim 1 further comprising:
 a casing defining a portion of the primary flowpath; and
 a core nacelle surrounding the casing, wherein the air cycle rotor is positioned radially inward of the casing.

3. The engine of claim 1 further comprising:
 a casing defining a portion of the primary flowpath;
 a core nacelle surrounding the casing; and
 a fan nacelle surrounding the core nacelle, wherein the air cycle rotor is positioned radially inward of the casing.

4. The engine of claim 1 wherein a casing defines a portion of the primary flowpath and the air cycle rotor is positioned radially inward of the casing.

5. The engine of claim 1 wherein the air cycle rotor is positioned radially inward of the primary flowpath of the engine, relative to the centerline axis.

6. The engine of claim 1 wherein the engine includes a positioned downstream of the compressor, and the heat exchanger is formed integrally with the diffuser.

7. The engine of claim 6 wherein the air cycle rotor is disposed radially inward of the diffuser.

8. The engine of claim 6 wherein an annular forward wall structure is positioned inboard of the diffuser and axially forward of the air cycle rotor and an annular aft wall structure is positioned inboard of the diffuser and aft of the air cycle rotor.

9. The engine of claim 8 wherein an array of air cycle compressor outlet vanes are positioned between the annular forward wall structure and the diffuser downstream of the at least one air cycle compressor and an array of air cycle compressor inlet vanes are positioned between the annular forward wall structure and an inner rotating seal upstream of the at least one air cycle compressor.

10. The engine of claim 8 wherein an array of air cycle nozzle vanes are positioned between the annular aft wall structure and the diffuser upstream of the at least one air cycle expander and an array of air cycle outlet guide vanes are positioned between the annular aft wall structure and a compressor discharge seal downstream of the at least one air cycle expander.

11. The engine of claim 1 wherein a casing surrounds at least one of the compressor, the combustor, and the turbine, and the heat exchanger is positioned outside the casing.

12. The engine of claim 11 further comprising a nacelle surrounding the casing, wherein the heat exchanger is positioned outside the nacelle.

13. A method of cooling air in a gas turbine engine of the type including a compressor, a combustor, and a turbine arranged in sequential flow relationship along a primary flowpath, the turbine being connected in mechanical driving relationship to the compressor, so as to define at least one engine rotor that is rotatable about a centerline axis of the engine, the method comprising:
 a secondary flowpath connected in flow communication with the primary flowpath, wherein the secondary flowpath is positioned radially inward of the primary flowpath, relative to the centerline axis; and bleeding air from the compressor from the primary flowpath into a secondary flowpath;

cooling the air bled from the compressor using an air cycle machine including an air cycle rotor carrying an at least one air cycle compressor and at least one air cycle expander, wherein the air cycle rotor is mechanically driven by the at least one engine rotor;

passing the compressed air from the air cycle compressor to a heat exchanger and rejecting heat from the compressed air;

passing the compressed air from the heat exchanger through the air cycle expander, wherein the air cycle rotor is integrated into the at least one engine rotor, and wherein the air cycle rotor includes an annular rotor disk having opposed a forward face and an aft face, the forward face including an array of compressor blades extending therefrom to define the at least one air cycle compressor and the aft face including an array of expander blades extending therefrom to define the at least one air cycle expander.

14. The method of claim 13 further comprising passing the air from the air cycle expander to a different part of the engine.

15. The method of claim 13 wherein a casing defines a portion of the primary flowpath and the air cycle rotor is positioned radially inward of the casing.

16. The method of claim 13 wherein the air cycle rotor is positioned radially inward of the primary flowpath of the engine, relative to the centerline axis.

* * * * *